(No Model.)
J. MONTO.
PLIERS.
No. 421,598. Patented Feb. 18, 1890.
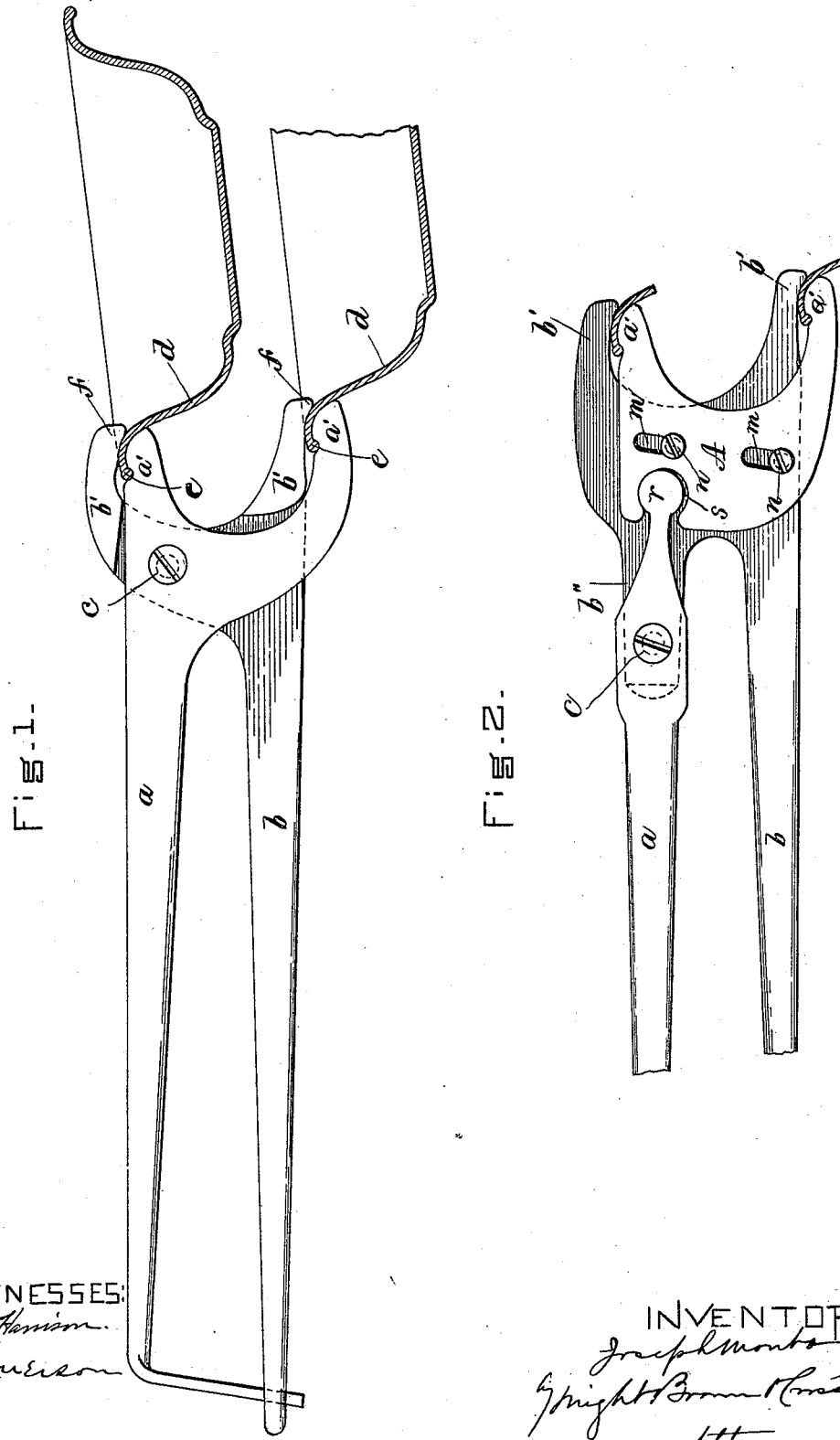

UNITED STATES PATENT OFFICE.

JOSEPH MONTO, OF CHELSEA, MASSACHUSETTS, ASSIGNOR, BY MESNE ASSIGNMENTS, TO THE STEEL EDGE STAMPING AND RETINNING COMPANY, OF PORTLAND, MAINE.

PLIERS.

SPECIFICATION forming part of Letters Patent No. 421,598, dated February 18, 1890.

Application filed February 23, 1889. Serial No. 300,864. (No model.)

*To all whom it may concern:*

Be it known that I, JOSEPH MONTO, of Chelsea, in the county of Suffolk and State of Massachusetts, have invented certain new and useful Improvements in Pliers, of which the following is a specification.

This invention has for its object to provide a tool whereby two or more articles—such as tinned sheet-metal pans—may be handled at the same time.

The invention consists of the improvements hereinafter fully described, and subsequently pointed out in the claim.

Of the accompanying drawings, forming a part of this specification, Figure 1 represents a side elevation of a tool or multiple-jaw nippers embodying my invention. Fig. 2 represents a modification.

The same letters of reference indicate the same parts in all both figures.

Referring to Fig. 1, $a\,b$ represent two levers or handles connected by a pivot. Each lever is provided with two arms or jaws, those of the lever $a$ being lettered $a'\,a'$, while those of the letter $b$ are lettered $b'\,b'$. The jaws $a'\,a'$ are arranged to co-operate with the jaws $b'\,b'$ in grasping two articles $d\,d$, which are here shown as sheet-metal basins, the jaws $a'\,a'$ having convex seats $e\,e$ to receive and fit the under sides of the rims of said basins, while the jaws $b'\,b'$ have concave seats $f\,f$ to fit the upper sides of said rims.

It is obvious that differently-shaped articles will require differently-shaped jaws, and that the jaws must be adapted to the shape of the articles to be held.

The jaws are opened and closed simultaneously by movements of the handles $a\,b$, and grasp and release the two articles simultaneously.

This improved tool or multiple-jaw nippers is intended particularly as a means for handling hot articles of sheet metal in connection with the machinery described in Letters Patent No. 372,555, granted to me November 1, 1887, for retinning such articles, the nippers herein described being adapted to apply and remove two articles simultaneously to and from the holder shown in said patent.

It is obvious that various changes may be made in the mechanical details of my improved nippers without departing from the spirit of my invention. In Fig. 2 I have shown such a modification. In the figure, $a\,b$ represent the two levers or handles connected by a pivot $c$, which passes through the lever $a$, near the end, and through an arm $b''$, extended back from the head of the lever $b$ for that purpose. The lever $b$ is also provided with two arms or jaws $b'\,b'$. Movably fitted to the head of the lever $b$ is a piece A, provided with the arms or jaws $a'\,a'$ and containing slots $m\,m$, through which pass screws $n\,n$. The said screws are screwed into the head of the lever $b$ and by their heads hold the piece A to said lever. The jaws $a'\,a'$ are arranged to co-operate with the jaws $b'\,b'$ in grasping articles simultaneously, as in the typical form of the nippers, and may be adapted to any form of article, as in the typical form. The shorter lever $a$ terminates in an arm with a circular head $r$, which extends into a circular recess $s$ in the piece A. When the two levers $a$ and $b$ are approached, the arm $r$, acting on the piece A, moves the same, with its jaws $a'\,a'$, toward the jaws $b'\,b'$, so as to grasp any interposed article, and upon the separation of the levers the jaws will be similarly forced apart. The slots $m\,m$ are placed at an obtuse angle to the lever $b$, and play is given to the head of the arm $r$ in the recess $s$, so that the piece A may have a slight forward movement as the jaws are closed and a slight backward movement as the jaws are opened, the more readily to receive and release the articles to be handled.

I claim—

The combination of the two pivotally-connected handles or levers, the jaws $a'\,a'$, connected with one lever, and the jaws $b'\,b'$, connected with the other lever, each jaw $a'$ having a recessed convex seat $e$ formed to fit the under side of the rim of a vessel $d$, while each jaw $b'$ has a concave seat $f$ formed to fit the opposite side of said rim, whereby two vessels $d$ may be firmly held side by side parallel each with the other, as set forth.

In testimony whereof I have signed my name to this specification, in the presence of two subscribing witnesses, this 13th day of February, A. D. 1889.

JOSEPH MONTO.

Witnesses:
C. F. BROWN,
A. D. HARRISON.